(12) United States Patent
Tokimasa et al.

(10) Patent No.: US 9,026,333 B2
(45) Date of Patent: May 5, 2015

(54) VEHICLE CONTROL DEVICE

(71) Applicant: Denso Corporation, Kariya, Aichi-pref. (JP)

(72) Inventors: Mitsuhiro Tokimasa, Aichi-ken (JP); Masakazu Doi, Obu (JP); Takumi Nagaya, Kariya (JP)

(73) Assignee: Denso Corporation, Kariya (JP)

( * ) Notice: Subject to any disclaimer, the term of this patent is extended or adjusted under 35 U.S.C. 154(b) by 11 days.

(21) Appl. No.: 13/790,335

(22) Filed: Mar. 8, 2013

(65) Prior Publication Data

US 2013/0261915 A1  Oct. 3, 2013

(30) Foreign Application Priority Data

Mar. 30, 2012 (JP) ................................ 2012-082064

(51) Int. Cl.
| | | |
|---|---|---|
| G06F 7/70 | (2006.01) | |
| B60T 7/12 | (2006.01) | |
| G06F 17/10 | (2006.01) | |
| B60Q 1/00 | (2006.01) | |
| G08G 1/16 | (2006.01) | |
| B60W 30/09 | (2012.01) | |
| B60W 30/095 | (2012.01) | |

(Continued)

(52) U.S. Cl.
CPC ........... *B60W 30/09* (2013.01); *B60W 30/0956* (2013.01); *B60W 50/087* (2013.01); *B60W 10/06* (2013.01); *B60W 10/18* (2013.01); *B60W 30/0953* (2013.01); *B60W 2520/10* (2013.01); *B60W 2520/105* (2013.01); *B60W 2540/103* (2013.01); *B60W 2550/302* (2013.01); *B60W 2550/308* (2013.01)

(58) Field of Classification Search
USPC ............... 701/70, 96, 301; 340/436, 903
See application file for complete search history.

(56) References Cited

U.S. PATENT DOCUMENTS

| | | | |
|---|---|---|---|
| 2004/0167702 A1* | 8/2004 | Isogai et al. | 701/96 |
| 2008/0004807 A1* | 1/2008 | Kimura et al. | 701/301 |

(Continued)

FOREIGN PATENT DOCUMENTS

| | | |
|---|---|---|
| JP | 4-215527 | 8/1992 |
| JP | 05-256170 | 10/1993 |

(Continued)

OTHER PUBLICATIONS

Office action dated Sep. 24, 2013 in corresponding Japanese Application No. 2012-082064.

*Primary Examiner* — James Trammell
*Assistant Examiner* — Majdi Alsomiri
(74) *Attorney, Agent, or Firm* — Harness, Dickey & Pierce, PLC

(57) ABSTRACT

A vehicle control device is provided that performs control to suppress a dangerous situation for a vehicle without causing a driver to experience discomfort when an accelerator is erroneously operated, by setting an abnormality judgment threshold for the accelerator operation to a value based on a degree of risk to the vehicle. An accelerator position judgment threshold is set to be lower when risk in the periphery of the vehicle is higher, intermediate when the risk is intermediate, and higher when the risk is lower. When the risk is higher, an abnormality judgment is made upon the accelerator being lightly stepped on, and control is performed to suppress a dangerous situation. As the risk changes to intermediate and lower, the abnormality judgment is made at a greater accelerator position.

13 Claims, 4 Drawing Sheets

(51) Int. Cl.
*B60W 50/08* (2012.01)
*B60W 10/06* (2006.01)
*B60W 10/18* (2012.01)

(56) References Cited

U.S. PATENT DOCUMENTS

2008/0288150 A1* 11/2008 Isogai et al. ............... 701/70
2010/0138123 A1* 6/2010 Tokimasa et al. ........... 701/70
2011/0066350 A1* 3/2011 Sonoda et al. .............. 701/96
2011/0187515 A1 8/2011 Saito et al.
2011/0196591 A1* 8/2011 Kuze ........................... 701/96
2012/0116665 A1* 5/2012 Aoki et al. ................. 701/301

FOREIGN PATENT DOCUMENTS

JP 2009-146203 7/2009
JP 2010-070069 4/2010
JP 2010-105553 5/2010

* cited by examiner

VEHICLE CONTROL DEVICE

CROSS-REFERENCE TO RELATED APPLICATION

This application is based on and claims the benefit of priority from earlier Japanese Patent Application No. 2012-082064 filed Mar. 30, 2012, the description of which is incorporated herein by reference.

BACKGROUND OF THE INVENTION

1. Field of the Invention

The present invention relates to a vehicle control device that controls a vehicle. In particular, the present invention relates to a vehicle control device capable of suppressing collision of a vehicle with an obstacle caused by an erroneous driving operation, such as a brake pedal or an accelerator pedal being mistakenly stepped on instead of the other.

2. Description of the Related Art

As this type of vehicle control device, a device is proposed that performs control to reduce the speed of a vehicle, when an inter-vehicle distance is shorter than a safe inter-vehicle distance set in association with the speed of the vehicle and an accelerator pedal stepping force is a predetermined value C or more (refer to, for example, JP-A-H04-215527). In this device, even when the inter-vehicle distance is short and the accelerator is mistakenly operated instead of the brake which should have been operated, the speed can be reduced without the vehicle being accelerated in adherence to the accelerator operation.

However, in the technology disclosed in JP-A-H04-215527, although the safe inter-vehicle distance changes depending on the speed of the vehicle, the predetermined value C does not change. Therefore, even in a situation where the slightest acceleration is not permissible, if the accelerator pedal is lightly stepped on, the vehicle may accelerate in adherence to the accelerator operation. On the other hand, even in a situation allowing some leeway, the speed is reduced if the accelerator pedal stepping force exceeds the predetermined value C. In this way, an abnormality judgment threshold for the amount of accelerator operation is conventionally set to a fixed value regardless of the risk to the vehicle. Therefore, the driver may experience discomfort.

Thus, there is a demand for a vehicle control device that is capable of performing control to suppress dangerous situations for the vehicle without causing the driver to experience discomfort, when the accelerator is erroneously operated.

SUMMARY

The present application provides a vehicle control device that includes: an operating amount acquiring means for acquiring an amount of acceleration operation of a vehicle; a peripheral environment detecting means for detecting a peripheral environment of the vehicle; a risk calculating means for calculating risk to the vehicle based on the peripheral environment detected by the peripheral environment detecting means; and a threshold setting means for setting a threshold value for the amount of accelerator operation based on the risk calculated by the risk calculating means. In the vehicle control device, a danger suppressing means suppresses a dangerous situation for the vehicle when the amount of accelerator operation acquired by the operation amount acquiring means exceeds the threshold set by the threshold setting means.

As described above, the vehicle control device of the present application sets the threshold for the amount of accelerator operation (abnormality judgment threshold) to a value based on the risk to the vehicle. When the amount of accelerator operation exceeds the threshold, the vehicle control device performs control to suppress a dangerous situation for the vehicle. Therefore, the control operation for suppressing a dangerous situation is performed in adherence to the degree by which the vehicle is placed in a dangerous situation. Thus, discomfort experienced by the driver in response to whether or not the control operation is performed can be suppressed.

DETAILED DESCRIPTION OF THE PREFERRED EMBODIMENTS (Configuration According to the Embodiment)

Figure 1:
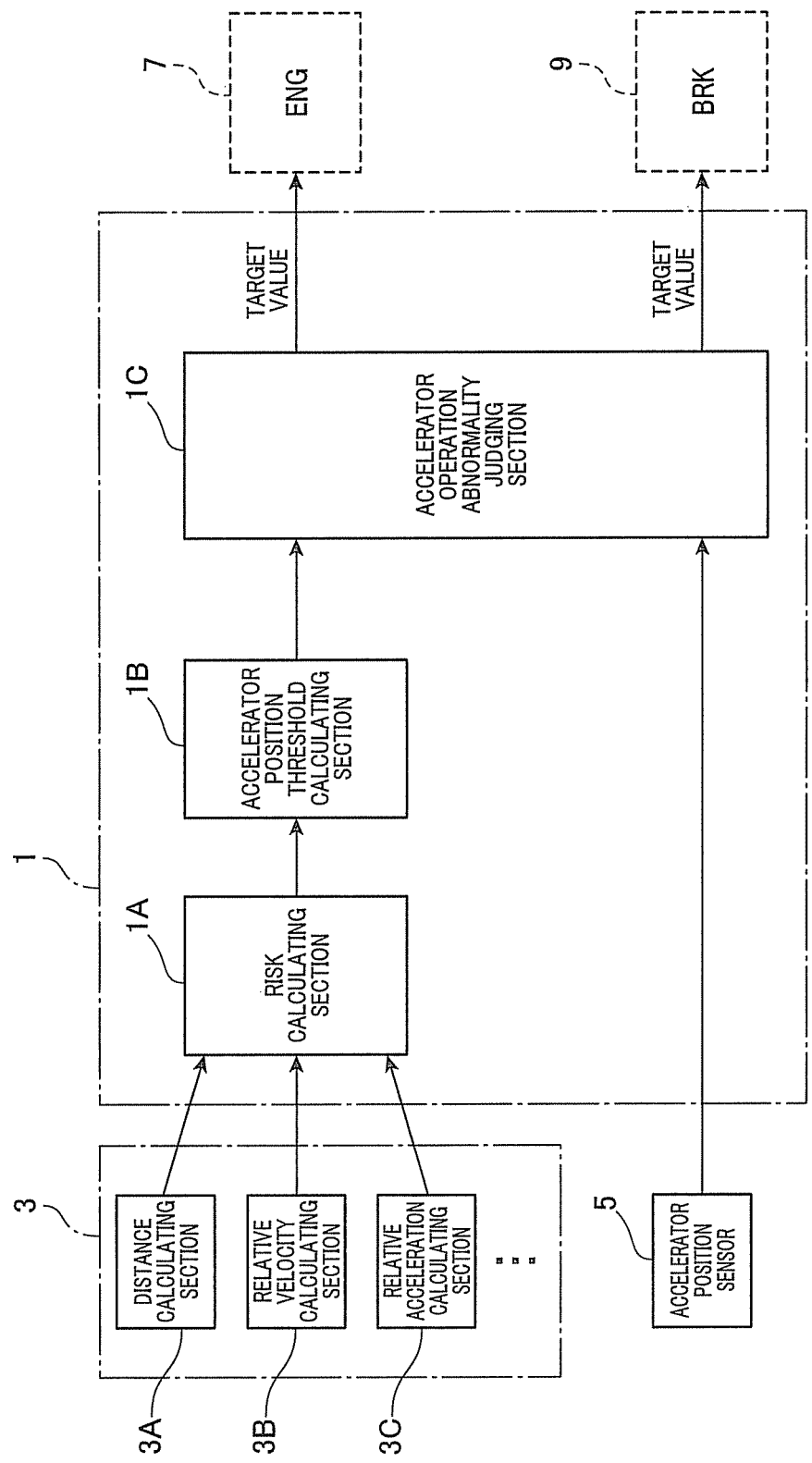
FIG. 1 is a block diagram of a configuration of a vehicle control device according to an embodiment of the present application.

An embodiment of the present invention will hereinafter be described with reference to the drawings. A vehicle control device according to the present embodiment is mounted in a vehicle (not shown). As shown in FIG. 1, an engine control unit (ECU) 1 serves as the core of the vehicle control device. In addition, an accelerator position sensor 5, a peripheral monitor sensor 3, an engine (ENG) 7, and a brake actuator (BRK) 9 are connected to the ECU 1.

The peripheral monitor sensor 3 is configured using a known in-vehicle radar. The peripheral monitor sensor 3 detects the positions of various objects present in the periphery of the vehicle. The peripheral monitor sensor 3 includes a distance calculating section 3A, a relative velocity calculating section 3B, a relative acceleration calculating section 3C, and the like that are configured by a microcomputer or the like. The distance calculating section 3A calculates the distance from the vehicle to the detected object. The relative velocity calculating section 3B calculates the relative velocity (positive value in the approaching direction) between the object and the vehicle by differentiating the distance calculated by the distance calculating section 3A with respect to time. The relative acceleration calculating section 3C calculates the relative acceleration between the object and the vehicle by differentiating the relative velocity calculated by the relative velocity calculating section 3B with respect to time.

The accelerator position sensor 5 is a known sensor that detects an amount by which the accelerator pedal (not shown) is stepped on (an example of an amount of accelerator operation and is referred to, hereinafter, as "accelerator position"). The accelerator position sensor 5 inputs the detected accelerator position into the ECU 1. The engine 7 adjusts the amount of fuel injection and ignition timing such that an output adhering to a target value inputted from the ECU 1 is achieved. The brake actuator 9 is a known hydraulic system that sends brake fluid to a wheel cylinder (not shown), regardless of the amount by which a brake pedal (not shown) is stepped on by the driver. The brake actuator 9 adjusts hydraulic pressure such that a braking force adhering to a target value inputted from the ECU 1 is achieved.

Processing operations of the ECU 1 can be divided into three sections, a risk calculating section 1A, an accelerator position threshold calculating section 1B, and an accelerator operation abnormality judging section 1C, as shown in FIG. 1. The risk calculating section 1A calculates the degree of risk to the vehicle (specifically, the risk of collision with an object), based on the distance, relative velocity, and relative acceleration with the object detected by the peripheral monitor sensor 3. The accelerator position threshold calculating section 1B calculates an accelerator position threshold (a corrected AP judgment threshold, described hereafter) based on the degree of risk calculated by the risk calculating section 1A. The accelerator operation abnormality judging section 1C judges that an abnormal accelerator operation is performed, when the accelerator position detected by the accelerator position sensor 5 exceeds the accelerator position threshold calculated by the accelerator position threshold calculating section 1B, and suppresses a dangerous situation for the vehicle. Specifically, the accelerator operation abnormality judging section 1B changes the target values inputted into the engine 7 and the brake actuator 9 to suppress acceleration of the vehicle or to suppress the cruising speed of the vehicle.

(Processing Operations According to the Embodiment)

Figure 2:
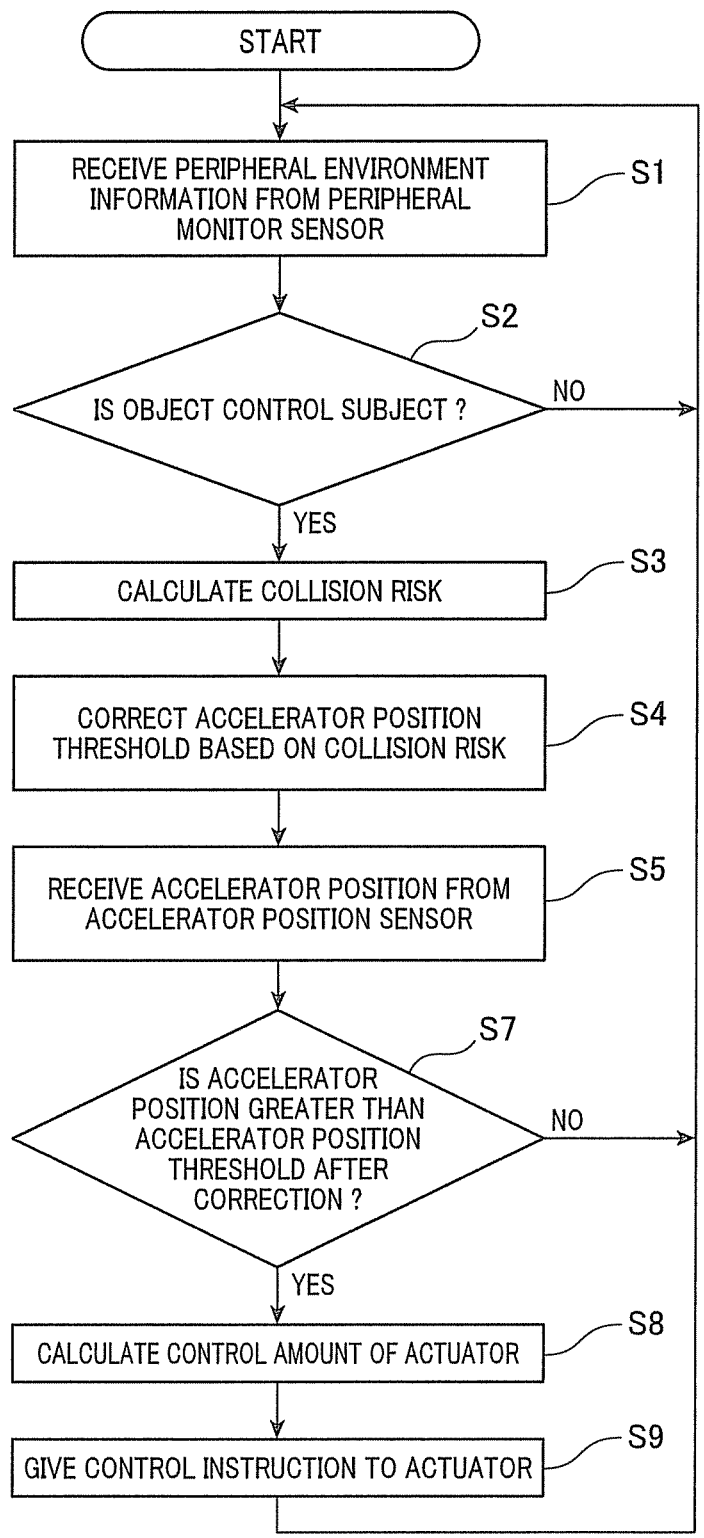
FIG. 2 is a flowchart of processing operations performed by the vehicle control device.

Details of the processing operations performed by the ECU 1 will hereinafter be described with reference to the flowchart in FIG. 2. The processing operations in FIG. 2 are performed when the ignition of the vehicle is turned ON. As shown in FIG. 2, in the processing operations, first, at Step (abbreviated as S) 1, the ECU 1 acquires peripheral environment information from the peripheral monitor sensor 3. In other words, the ECU 1 acquires the distance, relative velocity, and relative acceleration related to an object detected by the peripheral monitor sensor 3. At subsequent S2, the ECU 1 judges whether or not the object is a control subject, or in other words, whether or not the object is an obstacle that may collide with the vehicle. Then, when judged that the object is not a control subject (NO at S2), the ECU 1 proceeds to above-described 51. When judged that the object is a control subject (YES at S2), the ECU 1 proceeds to S3. When pieces of peripheral environment information are acquired for a plurality of objects at S1, the ECU 1 performs a looped process of S1 and S2 on each object by successively selecting the objects. When judged that an object to be considered a control subject is present (YES at S2), the ECU 1 performs the processing operations at S3 and subsequent steps on the object.

Figure 3:
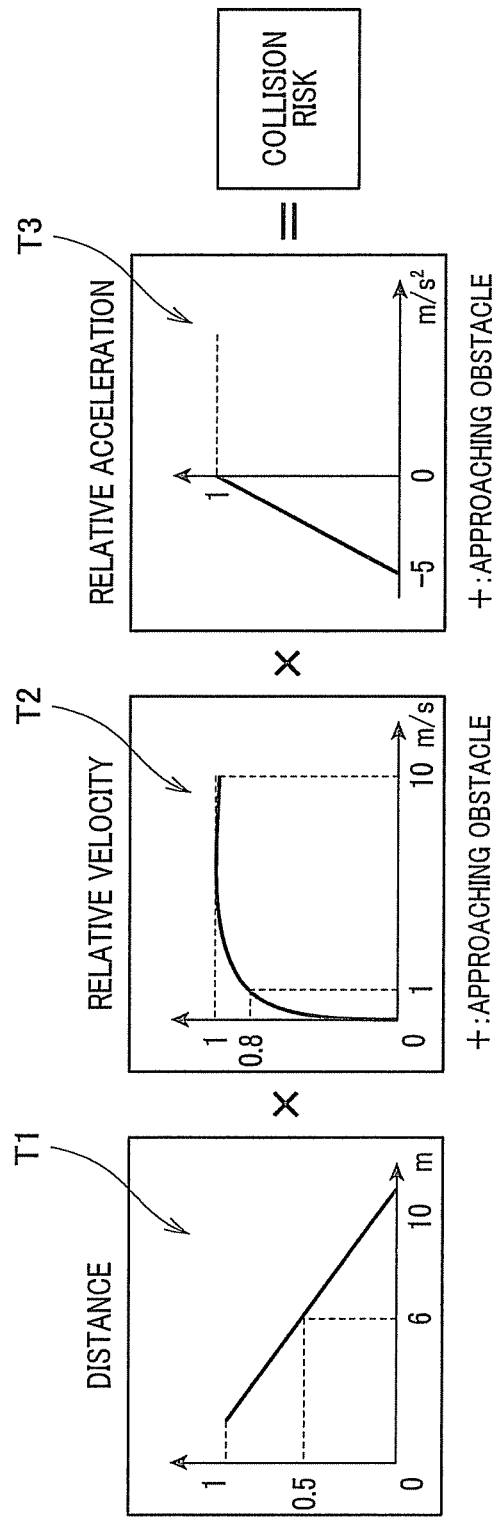
FIG. 3 is an explanatory diagram of an overview of a calculation of collision risk in the processing operations performed by the vehicle control device.

At S3, the ECU 1 calculates the collision risk as follows. In other words, as shown in FIG. 3, a read-only memory (ROM) of the ECU 1 stores therein three tables T1, T2, and T3 expressing the collision risk by values ranging from 0 to 1. At S3, the ECU 1 calculates the collision risk using the tables T1, T2, and 13. According to the present embodiment, the respective maximum values of the collision risk calculated using the tables T1, T2, and T3 are 1 for all tables. The respective minimum values are 0. However, tables indicating other values may be considered. In addition, in the description hereafter, letters a to h used to express coefficients in various mathematical formulas all express positive numbers (not limited to integers) that can be randomly set.

Table T1 expressing a correlation between distance and collision risk expresses a correlation in which the collision risk decreases in a linear-function manner as the distance increases. In other words, when the distance is X and the collision risk is K, $K=-aX+b$. According to the present embodiment, each coefficient is set such that the collision risk becomes 0 when the distance is 10 m and 0.5 when the distance is 6 m. When the distance is shorter than 2 m at which the collision risk becomes 1, the collision risk is 1.

Table 2 expressing a correlation between relative velocity and collision risk expresses a correlation in which the collision risk is also 0 when the relative velocity is 0. The collision risk monotonically increases as the relative velocity increases, and converges at 1 in a curve in an asymptotic manner. According to the present embodiment, each coefficient is set such that the collision risk is 1 when the relative velocity is 10 m/s and 0.8 when the relative velocity is 1 m/s that is equivalent to a speed at a creep phenomenon.

Table 3 expressing a correlation between relative acceleration and collision risk expresses a correlation in which the collision risk is 1 when the relative acceleration is 0 or more. When the relative acceleration is a negative value, the collision risk decreases from 1 in a linear-function manner as the absolute value of the relative acceleration increases. In other words, when the relative acceleration is Z ($Z \geq 0$) and the collision risk is K, $K=gZ+h$. According to the present embodiment, each coefficient is set such that the collision risk is 0 when the relative acceleration is $-5$ m/s$^2$. The collision risk is 0 when the relative acceleration is greater to the negative side than $-5$ m/s$^2$. At S3, the ECU 1 reads out the collision risks corresponding to the distance, relative velocity, and relative acceleration acquired from the peripheral monitor sensor 3 in relation to the object that is the control object from the tables T1 to T3. The ECU 1 then calculates the collision risk by multiplying the acquired collision risks with one another. Therefore, for example, when the vehicle is stopped in a position 10 m away from an object on the road (referred to, hereinafter, as Example 1), the distance is 10 m, the relative velocity is 0 m/s, and the relative acceleration is 0 m/s$^2$. In this instance, the multiplication corresponding to FIG. 3 is $0\times0\times1$, and the collision risk is 0. In other words, it is clear that there is no risk.

When the vehicle is approaching an object on the road by a creep phenomenon from a position 6 m away from the object (also referred to, hereinafter, as Example 2), the distance is 6 m, the relative velocity is 1 m/s, and the relative acceleration is 0 m/s$^2$. In this instance, the multiplication corresponding to FIG. 3 is $0.5\times0.8\times1$, and the collision risk is 0.4. In other words, it is clear that there is some risk.

Furthermore, when the vehicle is approaching an object on the road at 5 m/s from a position 1 m away from the object (also referred to, hereinafter, as Example 3), the distance is 1 m, the relative velocity is 5 m/s, and the relative acceleration is 0 m/s$^2$. In this instance, the multiplication corresponding to FIG. 3 is $1\times1\times1$, and the collision risk is 1. In other words, it is clear that there is great risk.

Returning to FIG. 3, when the collision risk is calculated at S3 as described above, at subsequent S4, the ECU 1 corrects the accelerator position judgment threshold (referred to hereinafter as an AP judgment threshold) by a following formula based on the calculated collision risk. In other words, when an AP judgment threshold serving as reference is a "reference AT judgment value,"

Corrected AP judgment threshold=reference AP judgment value×(1−collision risk)     (Formula 1)

The ECU 1 calculates the corrected AP judgment threshold that has been corrected using Formula 1. Here, when the reference AP judgment threshold is set to 100%, because the collision risk is 0 in above-described Example 1, the corrected AP judgment threshold=100(%)×(1−0)=100(%), based on formula 1. In a similar manner, in above-described Example 2, the corrected AP judgment threshold=100(%)×(1−0.4)=60(%). Furthermore, in above-described Example 3, the corrected AP judgment threshold=100(%)×(1−1)=0(%).

At subsequent S5, the ECU 1 receives the accelerator position from the accelerator position sensor 5. At S7, the ECU 1 judges whether or not the accelerator position received at S5 exceeds the accelerator position judgment threshold after correction (in other words, the corrected AP judgment threshold). When judged that the corrected AP judgment threshold is not exceeded (NO at S7), the ECU 1 determines that the accelerator operation is normal and proceeds to above-described S1. On the other hand, when judged that the accelerator position exceeds the corrected AP judgment threshold (YES at S7), the ECU 1 performs control to suppress a dangerous situation for the vehicle at S8 and S9. For example, in above-described Example 1, because the corrected AP judgment threshold is 100%, the ECU 1 does not judge that the accelerator operation is abnormal (YES at S7) unless the accelerator is stepped on by 100%. On the other hand, in Example 2, the ECU 1 judges that the accelerator operation is abnormal (YES at S7) when the accelerator is stepped on by 60%. In Example 3, the ECU 1 judges that the accelerator operation is abnormal (YES at S7) when the accelerator is even slightly stepped on.

When judged that the accelerator position exceeds the corrected AP judgment threshold and the accelerator operation is abnormal (YES at S7), at S8, the ECU 1 calculates a control amount (or in other words, a target value) of an actuator (or in other words, the engine 7 and the brake actuator 9). In other words, the ECU 1 calculates each target value so as to reduce output from the engine 7 and suppress acceleration of the vehicle, and apply braking force by the brake actuator 9 and suppress the cruising speed of the vehicle. At S9, the ECU 1 gives a control instruction to the actuator by outputting the target values to the engine 7 and the brake actuator 9, and proceeds to above-described S1.

As described above, according to the present embodiment, the
ECU 1 calculates the collision risk based on the distance between the vehicle and an obstacle (an object that is a control subject), the relative velocity between the vehicle and the obstacle, and the relative acceleration between the vehicle and the obstacle (S3). Then, when judged that the amount of accelerator operation exceeds the corrected AP judgment threshold corrected based on the collision risk (YES at S7), the ECU 1 performs control to suppress a dangerous situation for the vehicle (S8 and S9). Therefore, the control operation for suppressing a dangerous situation is performed based on the dangerous situation for the vehicle. Discomfort experienced by the driver in response to whether or not the control operation is performed can be suppressed.

Figure 4:
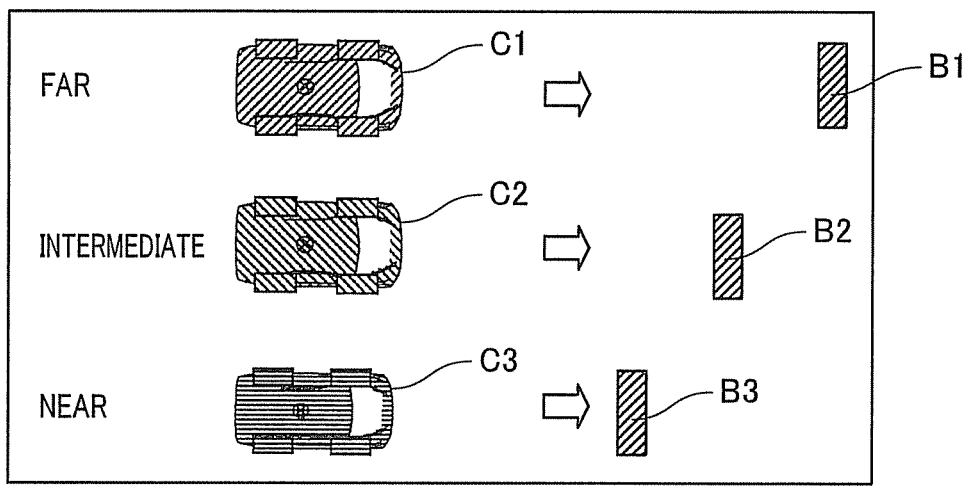
FIG. 4 is an explanatory diagram of examples of positioning between a vehicle and an obstacle.

FIG. 4 and FIG. 5 are explanatory diagrams of examples of how the above-described control operation is changed depending on the distance between the vehicle and the obstacle. As shown in FIG. 4, vehicle C1 is in a position far from obstacle B1, and the risk (collision risk) is low. Vehicle C2 is in an intermediate position from obstacle B2, and the risk is also intermediate. Furthermore, vehicle C3 is in a position near the obstacle B3, and the risk is high.

Figure 5A:
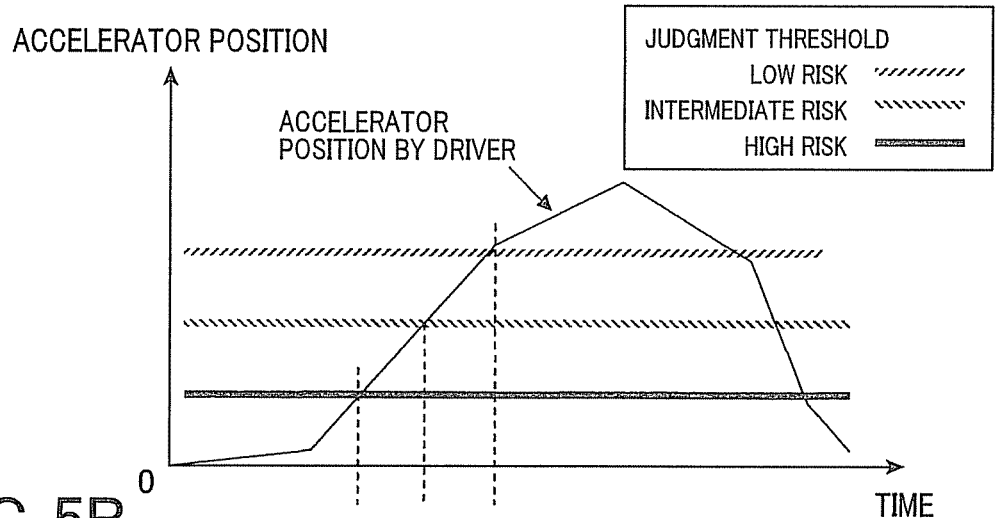
FIG. 5A and FIG. 5B are explanatory diagrams of the effects of the processing operations performed by the vehicle control device in relation to the examples of positioning between a vehicle and an obstacle.
Figure 5B:
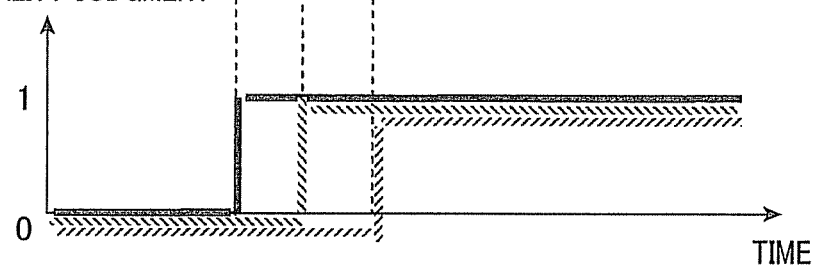

In this instance, the corrected AP judgment threshold (judgment threshold) is set to be low when the risk is high (example of vehicle C3), intermediate when the risk is intermediate (example of vehicle C2,), and high when the risk is low (example of vehicle C1), as shown in FIG. 5A. An instance is considered in which the amount by which the accelerator is stepped on by the driver (accelerator position) changes at this time, as shown by the solid line in FIG. 5A. When the risk is high, the ECU 1 judges that the accelerator operation is abnormal (YES at S7) upon the accelerator being even lightly stepped on, and performs the above-described control operation to suppress a dangerous situation (S8 and S9), as shown in FIG. 5B. On the other hand, as the risk changes to intermediate and low, the ECU 1 does not judge that the accelerator operation is abnormal unless the accelerator is further stepped on, nor does the ECU 1 perform the above-described control operation to suppress a dangerous situation. Therefore, discomfort experienced by the driver in response to whether or not the control operation for suppressing a dangerous situation (S8 and S9) is performed can be suppressed.

According to the above-described embodiment, the accelerator position sensor 5 is equivalent to an operation amount acquiring means. The peripheral monitor sensor 3 and the processing operation at S1 are equivalent to a peripheral environment detecting means. The risk calculating section 1A and the processing operation at S3 are equivalent to a risk calculating means. The accelerator position threshold calculating section 1B and the processing operation at S4 are equivalent to a threshold setting means. The accelerator operation abnormality judging section 1C and the processing operations at S8 and S9 are equivalent to a danger suppressing means.

(Other Embodiments)

The present invention is not limited in any way to the above-described embodiment. Various embodiments are possible without departing from the spirit of the present invention. For example, when only stationary objects on the road are considered obstacles, the cruising speed of the vehicle may be used instead of the relative velocity. As the control operation for suppressing a dangerous situation, only either of the control on the engine 7 (an example of acceleration suppressing control) or the control on the brake actuator 9 (an example of speed suppressing control) may be performed. A control operation that generates a warning by a buzzer sound or the like may also be performed. Furthermore, the amount of accelerator operation is not limited to the amount by which the accelerator pedal is stepped on. The accelerator may be operated by hand. In addition, the correlation between the distance (or cruising speed), relative velocity, or relative acceleration and the collision risk may be set to various correlations other than those according to the above-described embodiment.

What is claimed is:

1. A vehicle control device, comprising:
an operating amount acquiring unit acquiring an amount of accelerator operation of a vehicle;
a peripheral environment detecting unit detecting a peripheral environment of the vehicle;
a risk calculating unit calculating a risk to the vehicle based on the peripheral environment detected by the peripheral environment detecting unit;
a threshold setting unit setting a threshold value for the amount of accelerator operation based on the risk calculated by the risk calculating unit; and
a danger suppressing unit suppressing a dangerous situation for the vehicle when the amount of accelerator operation acquired by the operation amount acquiring unit exceeds the threshold set by the threshold setting unit; wherein the danger suppressing unit performs an acceleration suppressing control that suppresses acceleration of the vehicle as the control performed to suppress a dangerous situation for the vehicle; and a judgment threshold for the amount of accelerator operation is set to be low when the risk is high and set to be high when the risk is low.

2. The vehicle control device according to claim 1, wherein the risk calculating unit calculates the risk based on at least one of a distance between the vehicle and an obstacle of the vehicle detected by the peripheral environment detecting unit, a relative velocity between the vehicle and the obstacle, a cruising speed of the vehicle, and a relative acceleration between the vehicle and the obstacle.

3. The vehicle control device according to claim 2, wherein the risk calculating unit calculates the risk based on at least the distance, and a correlation between the distance and the risk in the calculation is a correlation in which the risk decreases as the distance increases.

4. The vehicle control device according to claim 3, wherein the danger suppressing unit performs a speed suppressing control that suppresses the cruising speed of the vehicle as the control performed to suppress a dangerous situation for the vehicle.

5. The vehicle control device according to claim 2, wherein the risk calculating unit calculates the risk based on at least the relative velocity or the cruising speed, and a correlation between the relative velocity or the cruising speed and the risk in the calculation is a correlation in which the risk is also 0 (zero) when the relative velocity or the cruising speed is 0 (zero), and the risk increases and is converged at a predetermined value other than 0 (zero) as the relative velocity or the cruising speed in a direction in which the vehicle and the obstacle become closer increases.

6. The vehicle control device according to claim 2, wherein the risk calculating unit calculates the risk based on at least the relative acceleration, and a correlation between the relative acceleration and the risk in the calculation is a correlation in which the risk is a predetermined value other than 0 (zero) when the relative acceleration in relation to a direction in which the vehicle and the obstacle become closer is a positive value, and when the relative acceleration in relation to the direction in which the vehicle and the obstacle become closer is a negative value, the risk decreases from the predetermined value as the absolute value of the negative value increases.

7. The vehicle control device according to claim 6, wherein the danger suppressing unit performs a speed suppressing control that suppresses the cruising speed of the vehicle as the control performed to suppress a dangerous situation for the vehicle.

8. The vehicle control device according to claim 2, wherein the danger suppressing unit performs a speed suppressing control that suppresses the cruising speed of the vehicle as the control performed to suppress a dangerous situation for the vehicle.

9. The vehicle control device according to claim 5, wherein the danger suppressing unit performs a speed suppressing control that suppresses the cruising speed of the vehicle as the control performed to suppress a dangerous situation for the vehicle.

10. The vehicle control device according to claim 1, wherein the risk calculating unit calculates the risk by multiplying at least two risks among a first risk based on a distance between the vehicle and an obstacle of the vehicle detected by the peripheral environment detecting unit, a second risk based on a relative velocity between the vehicle and the obstacle or a cruising speed of the vehicle, and a third risk based on a relative acceleration between the vehicle and the obstacle.

11. The vehicle control device according to claim 10, wherein the danger suppressing unit performs a speed suppressing control that suppresses the cruising speed of the vehicle as the control performed to suppress a dangerous situation for the vehicle.

12. The vehicle control device according to claim 1, wherein the danger suppressing unit performs an acceleration suppressing control that suppresses acceleration of the vehicle as the control performed to suppress a dangerous situation for the vehicle.

13. The vehicle control device according to claim 1, wherein the danger suppressing unit performs a speed suppressing control that suppresses the cruising speed of the vehicle as the control performed to suppress a dangerous situation for the vehicle.

* * * * *